US007447362B2

(12) United States Patent
Lev (10) Patent No.: US 7,447,362 B2
(45) Date of Patent: Nov. 4, 2008

(54) SYSTEM AND METHOD OF ENABLING A CELLULAR/WIRELESS DEVICE WITH IMAGING CAPABILITIES TO DECODE PRINTED ALPHANUMERIC CHARACTERS

(75) Inventor: Zvi Haim Lev, Tel Aviv (IL)

(73) Assignee: DSPV, Ltd., Tel Aviv (IL)

( * ) Notice: Subject to any disclaimer, the term of this patent is extended or adjusted under 35 U.S.C. 154(b) by 545 days.

(21) Appl. No.: 11/266,378

(22) Filed: Nov. 4, 2005

(65) Prior Publication Data

US 2006/0098874 A1     May 11, 2006

Related U.S. Application Data

(60) Provisional application No. 60/625,632, filed on Nov. 8, 2004.

(51) Int. Cl.
*G06K 9/48* (2006.01)
*G06K 9/62* (2006.01)
*G06K 9/36* (2006.01)

(52) U.S. Cl. ................ 382/200; 382/209; 382/290; 382/301

(58) Field of Classification Search ............ 382/182, 382/195, 199, 200, 202, 209, 289, 290, 292, 382/298, 301
See application file for complete search history.

(56) References Cited

U.S. PATENT DOCUMENTS

| | | | | |
|---|---|---|---|---|
| 5,237,627 | A | * | 8/1993 | Johnson et al. ............. 382/198 |
| 5,455,875 | A | | 10/1995 | Chevion et al. |
| 5,509,091 | A | * | 4/1996 | Aoki ......................... 382/298 |
| 5,579,471 | A | | 11/1996 | Barber et al. |
| 5,926,116 | A | | 7/1999 | Kitano et al. |
| 6,055,536 | A | | 4/2000 | Shimakawa et al. |
| 6,192,360 | B1 | | 2/2001 | Dumais et al. |
| 6,286,036 | B1 | | 9/2001 | Rhoads |
| 6,577,755 | B1 | | 6/2003 | Lorie |
| 6,651,053 | B1 | | 11/2003 | Rothschild |

(Continued)

OTHER PUBLICATIONS

Ismail Haritaoglu: "InfoScope: Link from Real World to Digital Information Space", Proceedings. Lecture Notes in Computer Science vol. 2201—Springer 2001: Gregory D. Abowd, Barry Brumitt, Steven A. Schafer (Eds.), Ubicomp 2001: Ubiquitous Computing, Third International Conference, Atlanta, Georgia, USA, Sep. 30-Oct. 2, 2001, pp. 247-255. ISBN 3-540-42614-0.

*Primary Examiner*—Bhavesh Mehta
*Assistant Examiner*—John B Strege
(74) *Attorney, Agent, or Firm*—Sughrue Mion, PLLC (57) ABSTRACT

A system and method for decoding printed alphanumeric characters from images or video sequences captured by a wireless device, including the pre-processing of the image or video sequence to optimize processing in all subsequent steps, the searching of one or more grayscale images for key alphanumeric characters on a range of scales, the comparing of the values on the range of scales to a plurality of templates in order to determine the characteristics of the alphanumeric characters, the performing of additional comparisons to a plurality of templates to determine character lines, line edges, and line orientation, the processing of information from prior operations to determine the corrected scale and orientation of each line, the recognizing of the identity of each alphanumeric characters in a string of such characters, and the decoding of the entire character string in digitized alphanumeric format.

9 Claims, 5 Drawing Sheets

U.S. PATENT DOCUMENTS

| | | |
|---|---|---|
| 6,687,421 B1 * | 2/2004 | Navon ................ 382/289 |
| 6,687,697 B2 | 2/2004 | Collins-Thompson et al. |
| 6,753,883 B2 | 6/2004 | Schena et al. |
| 6,766,363 B1 | 7/2004 | Rothschild |
| 6,947,571 B1 | 9/2005 | Rhoads et al. |
| 2002/0006212 A1 | 1/2002 | Rhoads et al. |
| 2002/0019784 A1 | 2/2002 | Ritz |
| 2002/0023218 A1 | 2/2002 | Lawandy et al. |
| 2002/0156866 A1 | 10/2002 | Schneider |
| 2003/0012562 A1 | 1/2003 | Lawandy et al. |
| 2003/0072467 A1 | 4/2003 | Brundage et al. |
| 2004/0128512 A1 | 7/2004 | Sharma et al. |
| 2005/0011957 A1 | 1/2005 | Attia et al. |
| 2005/0050165 A1 | 3/2005 | Hamynen |

* cited by examiner

SYSTEM AND METHOD OF ENABLING A CELLULAR/WIRELESS DEVICE WITH IMAGING CAPABILITIES TO DECODE PRINTED ALPHANUMERIC CHARACTERS

CROSS-REFERENCE TO RELATED APPLICATIONS

This application claims the benefit of U.S. Provisional Application Ser. No. 60/625,632, filed on Nov. 8, 2004, entitled, "System and Method of Enabling a Cellular/Wireless Device with Imaging Capabilities to Decode Printed Alphanumeric Characters", which is incorporated herein by reference in its entirety.

BACKGROUND OF THE INVENTION

1. Field of the Invention

The present invention relates generally to digital imaging technology, and more specifically it relates to optical character recognition performed by an imaging device which has wireless data transmission capabilities. This optical character recognition operation is done by a remote computational facility, or by dedicated software or hardware resident on the imaging device, or by a combination thereof. The character recognition is based on an image, a set of images, or a video sequence taken of the characters to be recognized. Throughout this patent, "character" is a printed marking or drawing, "characters" refers to "alphanumeric characters", and "alphanumeric" refers to representations which are alphabetic, or numeric, or graphic (typically with an associated meaning, including, for example, traffic signs in which shape and color convey meaning, or the smiley picture, or the copyright sign, or religious markings such as the Cross, the Crescent, the Start of David, and the like) or symbolic (for example, signs such as +, −, =, $, or the like, which represent some meaning but which are not in themselves alphabetic or numeric, or graphic marks or designs with an associated meaning), or some combination of the alphabetic, numeric, graphic, and symbolic.

2. Description of the Related Art

Technology for automatically recognizing alphanumeric characters from fixed fonts using scanners and high-resolution digital cameras has been in use for years. Such systems, generally called OCR (Optical Character Recognition) systems, are typically comprised of:

1. A high-resolution digital imaging device, such as a flatbed scanner or a digital camera, capable of imaging printed material with sufficient quality.

2. OCR software for converting an image into text.

3. A hardware system on which the OCR software runs, typically a general purpose computer, a microprocessor embedded in a device or on a remote server connected to the device, or a special purpose computer system such as those used in the machine vision industry.

4. Proper illumination equipment or setting, including, for example, the setup of a line scanner, or illumination by special lamps in machine vision settings.

Such OCR systems appear in different settings and are used for different purposes. Several examples may be cited. One example of such a purpose is conversion of page-sized printed documents into text. These systems are typically comprised of a scanner and software running on a desktop computer, and are used to convert single or multi-page documents into text which can then be digitally stored, edited, printed, searched, or processed in other ways.

Another example of such a purpose is the recognition of short printed numeric codes in industrial settings. These systems are typically comprised of a high end industrial digital camera, an illumination system, and software running on a general purpose or proprietary computer system. Such systems may be used to recognize various machine parts, printed circuit boards, or containers. The systems may also be used to extract relevant information about these objects (such as the serial number or type) in order to facilitate processing or inventory keeping. The VisionPro™ optical character verification system made by Cognex™ is one example of such a product.

A third example of such a purpose is recognition of short printed numeric codes in various settings. These systems are typically comprised of a digital camera, a partial illumination system (in which "partial" means that for some parts of the scene illumination is not controlled by this system, such as, for example, in the presence of outdoor lighting may exist in the scene), and software for performing the OCR. A typical application of such systems is License Plate Recognition, which is used in contexts such as parking lots or tolled highways to facilitate vehicle identification. Another typical application is the use of dedicated handheld scanning devices for performing scanning, OCR, and processing (e.g., translation to a different language)—such as the Quicktionary™ OCR Reading pen manufactured by Seiko which is used for the primary purpose of translating from one language to another language.

A fourth example of such a purpose is the translation of various sign images taken by a wireless PDA, where the processing is done by a remote server (such as, for example, the Infoscope™ project by IBM™). In this application, the image is taken with a relatively high quality camera utilizing well-known technology such as a Charge Couple Device (CCD) with variable focus. With proper focusing of the camera, the image may be taken at long range (for a street sign, for example, since the sign is physically much larger than a printed page, allowing greater distance between the object and the imaging device), or at short range (such as for a product label). The OCR processing operation is typically performed by a remote server, and is typically reliant upon standard OCR algorithms. Standard algorithms are sufficient where the obtained imaging resolution for each character is high, similar to the quality of resolution achieved by an optical scanner.

Although OCR is used in a variety of different settings, all of the systems currently in use rely upon some common features. These features would include the following:

First, these systems rely on a priori known geometry and setting of the imaged text. This known geometry affects the design of the imaging system, the illumination system, and the software used. These systems are designed with implicit or explicit assumptions about the physical size of the text, its location in the image, its, orientation, and/or the illumination geometry. For example, OCR software using input from a flatbed scanner assumes that the page is oriented parallel to the scanning direction, and that letters are uniformly illuminated across the page as the scanner provides the illumination. The imaging scale is fixed since the camera/sensor is scanning the page at a very precise fixed distance from the page, and the focus is fixed throughout the image. As another example, in industrial imaging applications, the object to be imaged typically is placed at a fixed position in the imaging field (for example, where a microchip to be inspected is always placed in the middle of the imaging field, resulting in fixed focus and illumination conditions). A third example is that license plate recognition systems capture the license plate at a given distance and horizontal position (due to car structure), and license plates themselves are at a fixed size with small variation. A fourth example is the street sign reading application, which assumes imaging at distances of a couple of feet or more (due to the physical size and location of a street sign), and hence assumes implicitly that images are well focused on a standard fixed-focus camera.

Second, the imaging device is a "dedicated one" (which means that it was chosen, designed, and placed for this particular task), and its primary or only function is to provide the required information for this particular type of OCR.

Third, the resulting resolution of the image of the alphanumeric characters is sufficient for traditional OCR methods of binarization, morphology, and/or template matching, to work. Traditional OCR methods may use any combination of these three types of operations and criteria. These technical terms mean the following:

"Binarization" is the conversion of a gray scale or color image into a binary one. Grey becomes pixels, which are exclusively (0) or (1). Under the current art, grayscale images captured by mobile cameras from short distances are too fuzzy to be processed by binarization. Algorithms and hardware systems that would allow binarization processing for such images or an alternative method would be improvement in the art, and these are one object of the present invention.

"Morphology" is a kind of operation that uses morphological data known about the image to decode that image. Most of the OCR methods in the current art perform part or all of the recognition phase using morphological criteria. For example, consecutive letters are identified as separate entities using the fact that they are not connected by contiguous blocks of black pixels. Another example is that letters can be recognized based on morphological criteria such as the existence of one or more closed loops as part of a letter, and location of loops in relation to the rest of the pixels comprising the letter. For example, the numeral "0" (or the letter O) could be defined by the existence of a closed loop and the absence of any protruding lines from this loop. When the images of characters are small and fuzzy, which happens frequently in current imaging technology, morphological operations cannot be reliably performed. Algorithms and hardware systems that would allow morphology processing or an alternative method for such images, would be improvement in the art, and these are one object of the present invention "Template Matching" is a process of mathematically comparing a given image piece to a scaled version of an alphanumeric character (such as, for example, the letter "A") and giving the match a score between 0 and 1, where 1 would mean a perfect fit. These methods are used in some License Plate Recognition (LPR) systems, where the binarization and morphology operations are not useful due to the small number of pixels for the character. However, if the image is blurred, which may be the case is the image has alternate light and shading, or where number of pixels for a character is very small, template matching will also fail, given current algorithms and hardware systems. Conversely, algorithms and hardware systems that would allow template matching in cases of blurred images or few pixels per character, would be an improvement in the art, and these are one object of the present invention.

Fourth, typically the resolution required by current systems is of on the order of 16 or more pixels on the vertical side of the characters. For example, the technical specifications of a modern current product such as the "Camreader"™ by Mediaseek™ indicate a requirement for the imaging resolution to provide at least 16 pixels at the letter height for correct recognition. It should be stressed that the minimum number of pixels require for recognition is not a hard limit. Some OCR systems, in some cases, may recognize characters with pixels below this limit, while other OCR systems, in other cases, will fail to recognize characters even above this limit. Although the point of degradation to failure is not clear in all cases, current art may be characterized such that almost all OCR systems will fail in almost always cases when where the character height of the image is on the order of 10 pixels or less, and almost all OCR systems in almost cases will succeed in recognition where the character height of the image is on the order of 25 pixels or more. Where text is relatively condensed, character heights are relatively short, and OCR systems in general will have great difficulty decoding the images. Alternatively, when the image suffers from fuzziness due to de-focusing (which can occur in, for example, imaging from a small distance using a fixed focus camera) and/or imager movement during imaging, the effective pixel resolution would also decrease below the threshold for successful OCR. Thus, when the smear of a point object is larger than one pixel in the image, the point smear function (PSF) should replace the term pixel in the previous threshold definitions.

Fifth, current OCR technology typically does not, and cannot, take into consideration the typical severe image de-focusing and JPEG compression artifacts which are frequently encountered in a wireless environment. For example, the MediaSeek™ product runs on a cell phone's local CPU (and not on a remote server). Hence, such a product can access the image in its non-transmitted, pre-encoded, and pristine form. Wireless transmission to a remote server (whether or not the image will be retransmitted ultimately to a remote location) creates the vulnerabilities of de-focusing, compression artifacts, and transmission degradation, which are very common in a wireless environment.

Sixth, current OCR technology works badly, or not at all, on what might be called "active displays" showing characters, that is, for example, LED displays, LCD displays, CRTs, plasma displays, and cell phone displays, which are not fixed but which have changing information due to type and nature of the display technology used.

Seventh, even apart from the difficulties already noted above, particularly the difficulties of wireless de-focusing and inability to deal with active display, OCR systems typically cannot deal with the original images generated by the digital cameras attached to wireless devices. Among other problems, digital cameras in most cases suffer from the following difficulties. First, their camera optics are fixed focus, and cannot image properly at distances of less than approximately 20 centimeters. Second, the optical components are often minimal or of low quality, which causes inconsistency of image sharpness, which makes OCR according to current technology very difficult. For example, the resolution of the imaging sensor is typically very low, with resolutions ranging from 1.3 Megapixel at best down to VGA image size (that is, 640 by 480 or roughly 300,000 pixels) in most models. Some models even have CIF resolution sensors (352 by 288, or roughly 100,000 pixels). Even worse, the current existing standard for 3G (Third Generation cellular) video-phones dictates a transmitted imaging resolution of QCIF (176 by 144 pixels). Third, due to the low sensitivity of the sensor and the lack of a flash (or insufficient light emitted by the existing flash), the exposure times required in order to yield a meaningful image in indoor lighting conditions are relatively large. Hence, when an image is taken indoors, the hand movement/shake of the person taking the image typically generates motion smear in the image, further reducing the image's quality and sharpness.

SUMMARY OF THE INVENTION

The present invention presents a method for decoding printed alphanumeric characters from images or video sequences captured by a wireless device, the method comprising, in an exemplary embodiment, pre-processing the image or video sequence to optimize processing in all subsequent steps, searching one or more grayscale images for key alphanumeric characters on a range of scales, comparing the key alphanumeric values to a plurality of template in order to determine the characteristics of the alphanumeric characters, performing additional comparisons to a plurality of templates to determine character lines, line edges, and line orientation, processing information from prior steps to determine the corrected scale and orientation of each line, recognizing the identity of each alphanumeric character in string of such characters, and decoding the entire character string in digitized alphanumeric format. Throughout this patent, "printed" is used expansively to mean that the character to be imaged is captured on a physical substance (as by, for example, the impression of ink on a paper or a paper-like substance, or by engraving upon a slab of stone), or is captured on a display device (such as LED displays, LCD displays, CRTs, plasma displays, or cell phone displays). "Printed" also includes typed, or generated automatically by some tool (whether the tool be electrical or mechanical or chemical or other), or drawn whether by such a tool or by hand.

The present invention also presents a system for decoding printed alphanumeric characters from images or video sequences captured by a wireless device, the system comprising, in a exemplary embodiment, an object to be imaged or to be captured by video sequence, that contains within it alphanumeric characters, a wireless portable device for capturing the image video sequence, and transmitting the captured image or video sequence to a data network, a data network for receiving the image or video sequence transmitted by the wireless portable device, and for retransmitting it to a storage server, a storage receiver for receiving the retransmitted image or video sequence, for storing the complete image or video sequence before processing, and for retransmitting the stored image or video sequence to a processing server, and a processing server for decoding the printed alphanumeric characters from the image or video sequence, and for transmitting the decoded characters to an additional server.

The present invention also presents a processing server within a telecommunication system for decoding printed alphanumeric characters from images or video sequences captured by a wireless device, the processing server comprising, in an exemplary embodiment, a server for interacting with a plurality of storage servers, a plurality of content/information servers, and a plurality of wireless messaging servers, within the telecommunication system for decoding printed alphanumeric characters from images, the server accessing image or video sequence data sent from a data network via a storage server, the server converting the image or video sequence data into a digital sequence of decoded alphanumeric characters, and the server communicating such digital sequence to an additional server.

The present invention also presents a computer program product, comprising a computer data signal in a carrier wave having computer readable code embodied therein for causing a computer to perform a method comprising, in an exemplary embodiment, pre-processing an alphanumeric image or video sequence, searching on a range of scales for key alphanumeric characters in the image or sequence, determining appropriate image scales, searching for character lines, line edges, and line orientations, correcting for the scale and orientation, recognizing the strings of alphanumeric characters, and decoding the character strings.

BRIEF DESCRIPTION OF THE DRAWINGS

Various other objects, features and attendant advantages of the present invention will become fully appreciated as the same become better understood when considered in conjunction with the accompanying detailed description, the appended claims, and the accompanying drawings, in which:

DETAILED DESCRIPTION OF THE PREFERRED EMBODIMENTS

This invention presents an improved system and method for performing OCR for images and/or video clips taken by cameras in phones or other wireless devices.

The system includes the following main components:

1. A wireless imaging device, which may be a camera phone, a webcam with a WiFi interface, a PDA with a WiFi or cellular card, or some such similar device. The device is capable of taking images or video clips (live or off-line).

2. Client software on the device enabling the imaging and sending of the multimedia files to a remote server. This client software may be embedded software which is part of the device, such as, for example, an email client, or an MMS client, or an H.324 Video telephony client. Alternatively, this client software may be downloaded software, either generic software such as blogging software (for example, the Picoblogger™ product by Picostation™), or special software designed specifically and optimized for the OCR operation.

3. A remote server with considerable computational resources. In this context, "considerable" means that the remote server meets either of two criteria. First, the server may perform calculations faster than the local CPU of the imaging device by at least one order in magnitude, that is, 10 times or more faster than the ability of the local CPU. Second, the remote server may be able to perform calculations that the local CPU of the imaging device is totally incapable of due to other limitations, such as limitation of memory or limitation of battery power.

The method of operation of the system may be summarized as follows:

1. The user uses the client software running on the imaging device to acquire an image/video clip of printed alphanumeric information. (In this context, and throughout the application, "alphanumeric information" means information which is wholly numeric, or wholly alphabetic, or a combination of numeric and alphabetic.) This alphanumeric information can be printed on paper (such as, for example, a URL on an advertisement in a newspaper), or printed on a product (such as, for example, the numerals on a barcode printed on a product's packaging), or displayed on a display (such as a CRT, an LCD display, a computer screen, a TV screen, or the screen of another PDA or cellular device).

2. This image/clip is sent to the server via wireless networks or a combination of wireline and wireless networks. For example, a GSM phone may use the GPRS/GSM network to upload an image, or a WiFi camera may use the local WiFi WLAN to send the data to a local base station from which the data will be further sent via a fixed line connection.

3. The server, once the information arrives, performs a series of image processing and/or video processing operations to find whether alphanumeric characters are indeed contained in the image/video clip. If they are, server extracts the relevant data and converts it into an array of characters. In addition, the server retains the relative positions of those characters as they appear in the image/video clip, and the imaging angle/distance as measured by the detection algorithm.

4. Based on the characters obtained in the prior step, and based potentially on other information that is provided by the imaging device, and/or resident on external databases, and/or stored in the server itself, the server may initiate one of several applications located on the server or on remote separate entities. Extra relevant information used for this stage may include, for example, the physical location of the user (extracted by the phone's GPS receiver or by the carrier's Location Based Services-LBS), the MSISDN (Mobile International Subscriber Directory Number) of the user, the IMEI (International Mobile Equipment Identity) number of the imaging device, the IP address of the originating client application, or additional certificates/PKI (Public Key Infrastructure) information relevant to the user.

Various combinations of the steps above, and/or repetitions of various steps, are possible in the various embodiments of the invention. Thus, there is a combinatorially large number of different complete specific implementations. Nevertheless, for purposes of clarity these implementations may be grouped into two broad categories, which shall be called "multiple session implementations", and "single session implementations", and which are set forth in detail in the Detailed Description of the Exemplary Embodiments.

Figure 1:
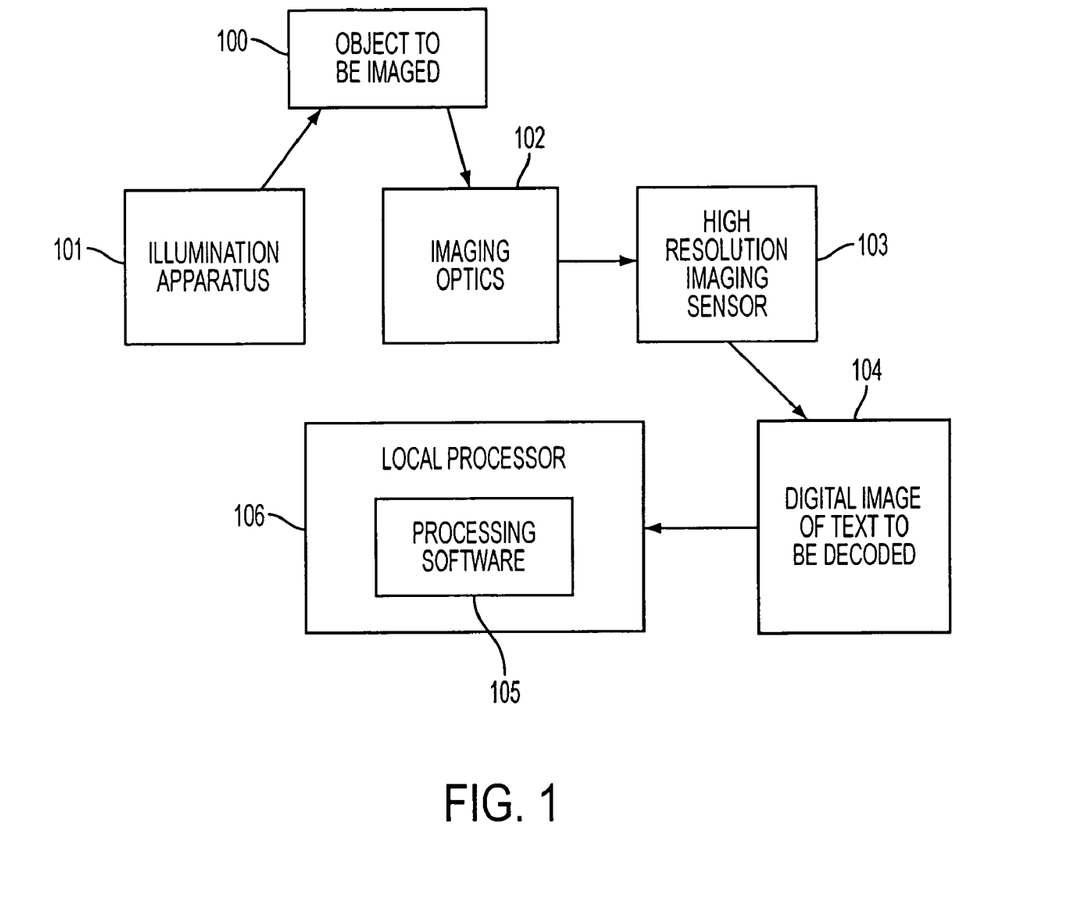
FIG. 1 is a block diagram of a prior art OCR system which may be implemented on a mobile device.

FIG. 1 illustrates a typical prior art OCR system. There is an object which must be imaged 100. The system utilizes special lighting produced by the illumination apparatus 101, which illuminates the image to be captured. Imaging optics 102 (such as the optical elements used to focus light on the digital image sensor) and high resolution imaging sensors 103 (typically an IC chip that converts incoming light to digital information) generate digital images of the printed alphanumeric text 104 which have high resolution (in which "high resolution" means many pixels in the resulting image per each character), and where there is a clear distinction between background pixels (denoting the background paper of the text) and the foreground pixels belonging to the alphanumeric characters to be recognized. The processing software 105 is executed on a local processor 106, and the alphanumeric output can be further processed to yield additional information, URL links, phone numbers, or other useful information. Such a system can be implemented on a mobile device with imaging capabilities, given that the device has the suitable components denoted here, and that the device has a processor that can be programmed (during manufacture or later) to run the software 105.

Figure 2:
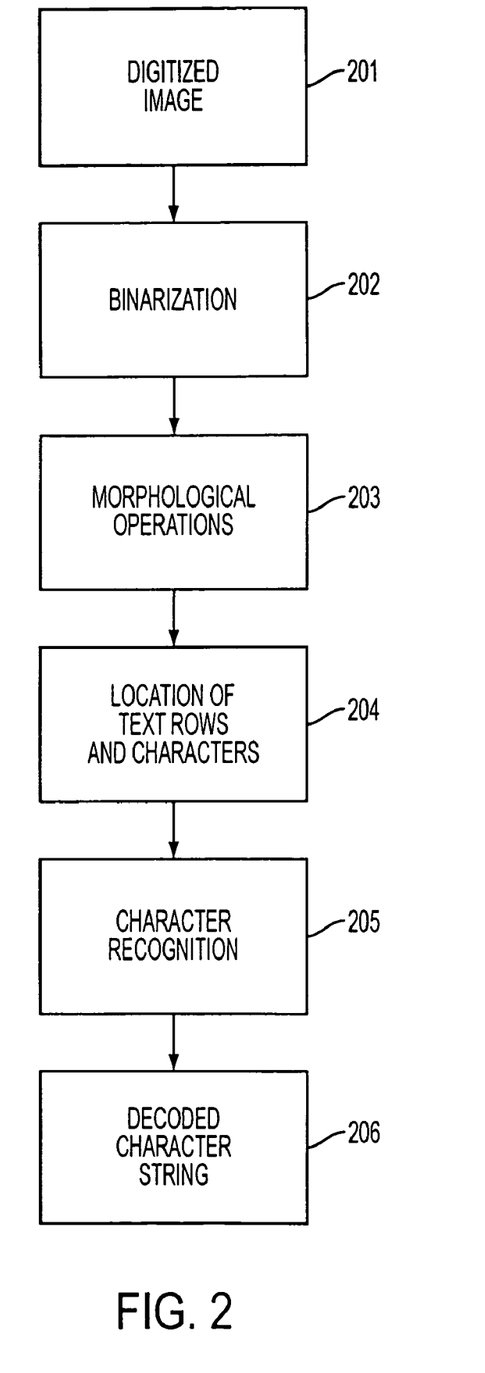
FIG. 2 is a flowchart diagram of the processing steps in a prior art OCR system.

FIG. 2 illustrates the key processing steps of a typical prior art OCR system. The digitized image 201 undergoes binarization 202. Morphological operations 203 are then applied to the image in order to remove artifacts resulting from dirt or sensor defects. Then morphological operations 203 then identify the location of rows of characters and the characters themselves 204. In step 205, characters are recognized by the system based on morphological criteria and/or other information derived from the binarized image of each assumed character. The result is a decoded character string 206 which can then be passed to other software in order to generate various actions.

Figure 3:
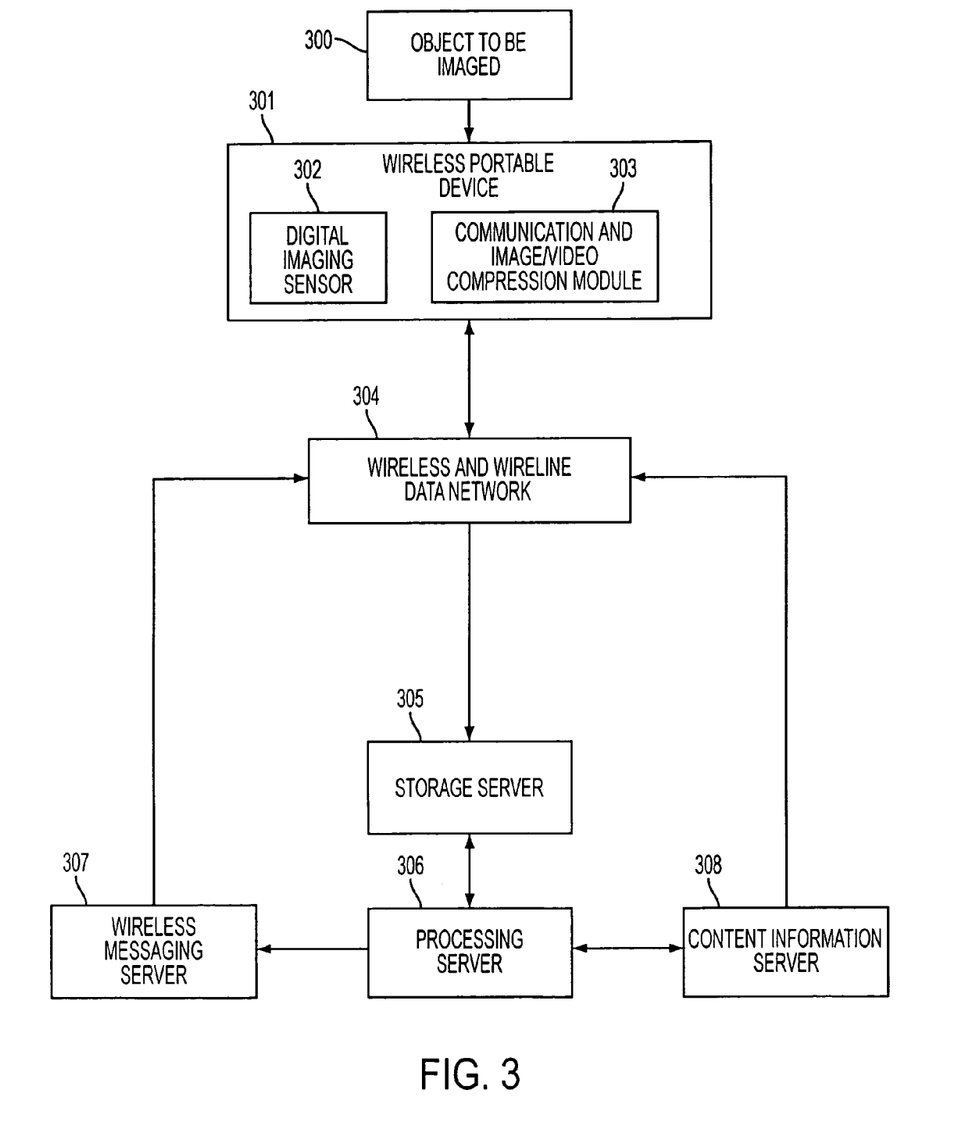
FIG. 3 is a block diagram of the different components of an exemplary embodiment of the present invention.

In FIG. 3, the main components of an exemplary embodiment of the present invention are described. The object to be imaged 300, which presumably has alphanumeric characters in it, may be printed material or a display device, and may be binary (like old calculator LCD screens), monochromatic or in color. There is wireless portable device 301 (that may be handheld or mounted in any vehicle) with a digital imaging sensor 302 which includes optics. Lighting element 101 from FIG. 1 is not required or assumed here, and the sensor according to the preferred embodiment of the invention need not be high resolution, nor must the optics be optimized to the OCR task. Rather, the wireless portable device 301 and its constituent components may be any ordinary mobile device with imaging capabilities. The digital imaging sensor 302 outputs a digitized image which is transferred to the communication and image/video compression module 303 inside the portable device 301. This module encapsulates and fragments the image or video sequence in the proper format for the wireless network, while potentially also performing compression. Examples of formats for communication of the image include email over TCP/IP, and H.324M over RTP/IP. Examples of compression methods are JPEG compression for images, and MPEG 4 for video sequences.

The wireless network 304 may be a cellular network, such as a UMTS, GSM, iDEN or CDMA network. It may also be a wireless local area network such as WiFi. This network may also be composed of some wireline parts, yet it connects to the wireless portable device 301 itself wirelessly, thereby providing the user of the device with a great degree of freedom in performing the imaging operation.

The digital information sent by the device 301 through the wireless network 304 reaches a storage server 305, which is typically located at considerable physical distance from the wireless portable device 301, and is not owned or operated by the user of the device. Some examples of the storage server are an MMS server at a communication carrier, an email server, a web server, or a component inside the processing server 306. The importance of the storage server is that it stores the complete image/video sequence before processing of the image/video begins. This system is unlike some prior art OCR systems that utilize a linear scan, where the processing of the top of the scanned page may begin before the full page has been scanned. The storage server may also perform some integrity checks and even data correction on the received image/video.

The processing server 306 is one novel component of the system, as it comprises the algorithms and software enabling OCR from mobile imaging devices. This processing server 306 accesses the image or video sequence originally sent from the wireless portable device 301, and converts the image or video sequence into a digital sequence of decoded alphanumeric characters. By doing this conversion, processing server 306 creates the same kind of end results as provided by prior art OCR systems such as the one in depicted in FIG. 1, yet it accomplishes this result with fewer components and without any mandatory changes or additions to the wireless portable device 301. A good analogy would be comparison between an embedded data entry software on a mobile device on the one hand, and an Interactive Voice Response (IVR) system on the other. Both the embedded software and the IVR system accomplish the decoding of digital data typed by the user on mobile device, yet in the former case the device must be programmable and the embedded software must be added to the device, whereas the IVR system makes no requirements of the device except that the device should be able to handle a standard phone call and send standard DTMF signals. Similarly, the current system makes minimal requirements of the wireless portable device 301.

After or during the OCR decoding process, the processing server 306 may retrieve content or information from the external content/information server 308. The content/information server 308 may include pre-existing encoded content such as audio files, video files, images, and web pages, and also may include information retrieved from the server or calculated as a direct result of the user's request for it (such as, for example, a price comparison chart for a specific product, or the expected weather at a specific site, or a specific purchase deals or coupons offered to the user at this point in time). It will be appreciated that the contents/information server 308 may be configured in multiple ways, including, solely by way of example, one physical server with databases for both content and information, or one physical server but with entirely different physical locations for content versus information, or multiple physical servers, each with its own combination of external content and results. All of these configurations are contemplated by the current invention.

Based on the content and information received from the content/information server 308, the processing server 306 may make decisions affecting further actions. One example would be that, based on the user information stored on some content/information server 308, the processing server 306 may select, for example, specific data to send to the user's wireless portable device 301 via the wireless messaging server 307. Another example would be that the processing server 306 merges the information from several different content/information servers 308 and creates new information from it, such as, for example, a comparing price information from several sources and sending the lowest offer to the user.

The feedback to the user is performed by having the processing server 306 submit the content to a wireless messaging server 307. The wireless messaging server 307 is connected to the wireless and wireline data network 304 and has the required permissions to send back information to the wireless portable device 301 in the desired manner. Examples of wireless messaging servers 307 include a mobile carrier's SMS server, an MMS server, a video streaming server, and a video gateway used for mobile video calls. The wireless messaging server 307 may be part of the mobile carrier's infrastructure, or may be another external component (for example, it may be a server of an SMS aggregator, rather than the server of the mobile carrier, but the physical location of the server and its ownership are not relevant to the invention). The wireless messaging server 307 may also be part of the processing server 306. For example, the wireless messaging server 307 might be a wireless data card or modem that is part of the processing server 306 and that can send or stream content directly through the wireless network.

Another option is for the content/information server 308 itself to take charge and manage the sending of the content to the wireless device 301 through the network 304. This could be preferred because of business reasons (e.g., the content distribution has to be controlled via the content/information server 308 for DRM or billing reasons) and/or technical reasons (that is, in this mode the content/information server 308 is a video streaming server which resides within the wireless carrier infrastructure and hence has a superior connection to the wireless network over that of the processing server).

FIG. 3 demonstrates that exemplary embodiments of the invention includes both "Single Session" and "Multiple Session" operation.

In "Single Session" operation, the different steps of capturing the image/video of the object, the sending and the receiving of data are encapsulated within a single mode of wireless device and network operation. Graphically, the object to be imaged 300 is imaged by the wireless portable device 301, including image capture by the digital imaging sensor 302 and processing by the communication and image/video compression module 303. Data communicated to the wireless and wireline data network 304, hence to the storage server 305, then to the processing server 306, where there may or may not be interaction with the content/information server 308 and/or the wireless messaging server 307. If data is indeed sent back to the user device 301 through the messaging server 307, then by definition of "single session" this is done while the device 301 is still in the same data sending/receiving session started by the user sending the original image and/or video. At the same time, additional data may be sent through the messaging server 307 to other devices/addresses.

The main advantages of the Single Session mode of operation are ease of use, speed (since no context switching is needed by the user or the device), clarity as to the whole operation and the relation between the different parts, simple billing, and in some cases lower costs due to the cost structure of wireless network charging. The Single Session mode may also yield greater reliability since it relies on fewer wireless services to be operative at the same time.

Some modes which enable single session operation are:

A 3G H.324M/IMS SIP video Telephony session where the user points the device at the object, and then receives instructions and resulting data/service as part of this single video-telephony session.

A special software client on the phone which provides for image/video capture, sending of data, and data retrieval in a single web browsing, an Instant Messaging Service (IMS) session (also known as a Session Initiation Protocol or SIP session) or other data packet session.

Typically, the total time since the user starts the image/video capture until the user receives back the desired data could be a few seconds up to a minute or so. The 3G 324M scenario is suitable for UMTS networks, while the IMS/SIP and special client scenarios could be deployed on WiFi, CDMA 1x, GPRS, iDEN networks.

"Multiple Session" operation is a mode of usage operation the user initiates a session of image/video capture, the user then sends the image/video, the sent data then reaches a server and is processed, and the resulting processed data/services are then sent back to the user via another session. The key difference between Multiple Session and Single Session is that in Multiple Session the processed data/services are sent back to the user in a different session or multiple sessions. Graphically, Multiple Session is the same as Single Session described above, except that communication occurs multiple times in the Multiple Session and/or through different communication protocols and sessions.

The different sessions in Multiple Session may involve different modes of the wireless and wireline and wireline data network 304 and the sending/receiving wireless portable device 301. A Multiple Session operation scenario is more complex typically than a Single Session, but may be the only mode currently supported by the device/network or the only suitable mode due to the format of the data or due to cost considerations. For example, when a 3G user is roaming in a different country, the single session video call scenario may be unavailable or too expensive, while GPRS roaming enabling MMS and SMS data retrieval, with is an example of Multiple Session, would still be an existent and viable option.

Examples of image/video capture as part of a multiple session operation would be:

The user may take one or more photos/video clips using an in-built client of the wireless device.

The user may take one or more photos/video clips using a special software client resident on the device (e.g., a Java MIDLet or a native code application).

The user may make a video call to a server where during the video call the user points the phone camera at the desired object.

Examples of possible sending modes as part of a multiple session operation would be:

The user uses the device's in-built MMS client to send the captured images/video clips to a phone number, a shortcode or an email address.

The user uses the device's in-built Email client to send the captured images/video clips to an email address.

The user uses special software client resident on the device to send the data using a protocol such as HTTP.POST, UDP or some other TCP protocol, etc.

Examples of possible data/service retrieval modes as part of a multiple session operation are:

The data is sent back to the user as a Short Message Service (SMS).

The data is sent back to the user as a Multimedia Message (MMS).

The data is sent back to the user as an email message.

A link to the data (a phone number, an email address, a URL etc.) is sent to the user encapsulated in an SMS/MMS/email message.

A voice call/video call to the user is initiated from an automated/human response center.

An email is sent back to the user's pre-registered email account (unrelated to his wireless portable device 301).

A combination of several of the above listed methods—e.g., a vCARD could be sent in an MMS, at the same time a URL could be sent in an SMS, and a voice call could be initiated to let the user know he/she has won some prize.

Naturally, any combination of the capture methods {a,b,c}, the sending methods {d,e,f} and the data retrieval methods {g,h,i,j,k,l,m} is possible and valid.

Typically, the total time since the user starts the image/video capture until the user received back the desired data could be 1-5 minutes. The multiple session scenario is particularly suitable for CDMA 1x, GPRS, iDEN networks, as well as for Roaming UMTS scenarios. Typically, a multiple session scenario would involve several separate billing events in the user's bill.

Figure 4:
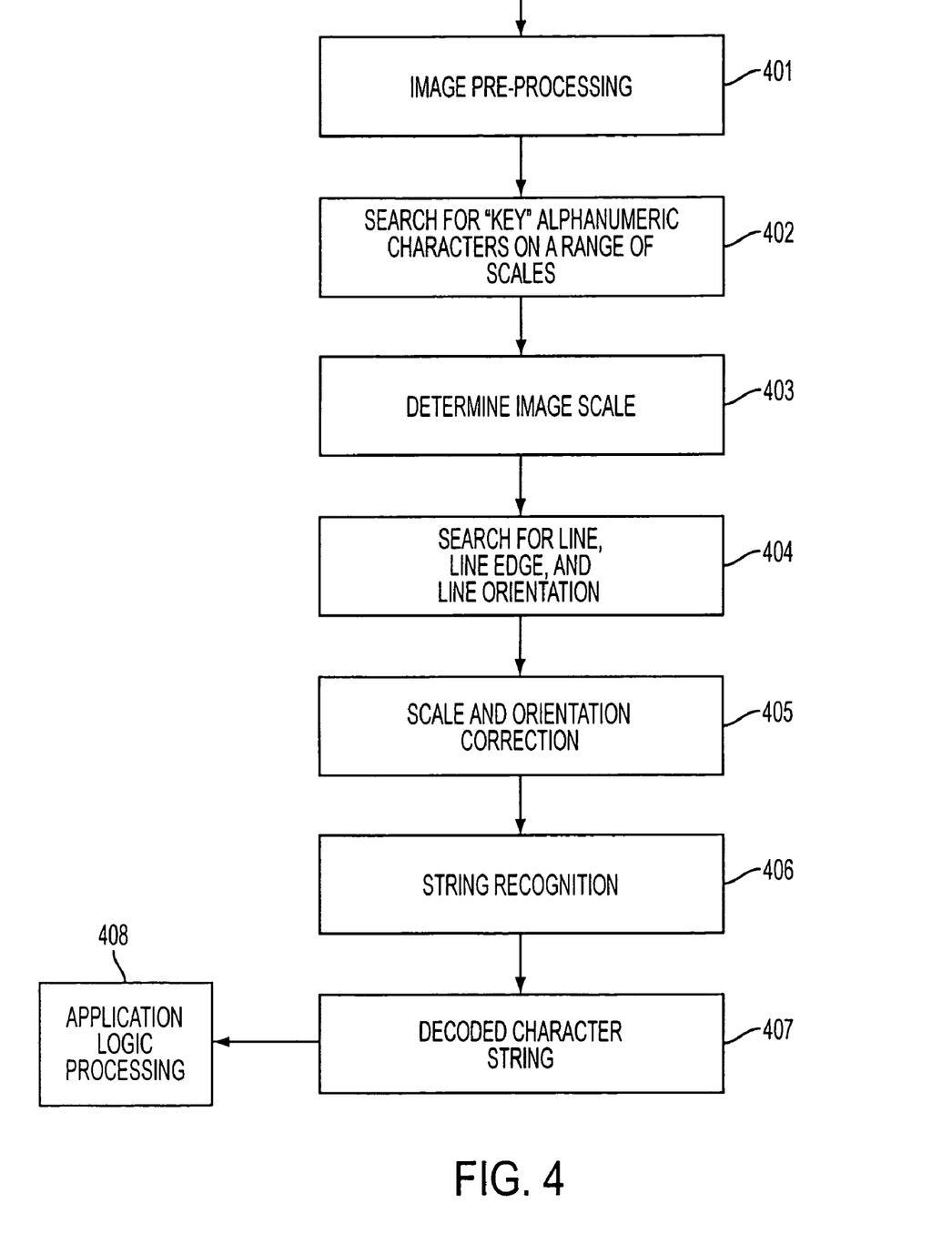
FIG. 4 is flow chart diagram of the processing flow used by the processing server in the system in order to decode alphanumeric characters in the input.

FIG. 4 depicts the steps by which the processing server 306 converts input into a string of decoded alphanumeric characters. In the preferred embodiment, all of steps in FIG. 4 executed in the processing server 306. However, in alternative embodiments, some or all of these steps could also be performed by the processor of the wireless portable device 301 or at some processing entities in the wireless and wireline data network 304. The division of the workload among 306, 301, and 304, in general is a result of the optimization between minimizing execution times on one hand, and data transmission volume and speed on the other hand.

In step 401, the image undergoes pre-processing designed to optimize the performance of the consecutive steps. Some examples of such image pre-processing 401 are conversion from a color image to a grayscale image, stitching and combining several video frames to create a single larger and higher resolution grayscale image, gamma correction to correct for the gamma response of the digital imaging sensor 302, JPEG artifact removal to correct for the compression artifacts of the communication and image/video compression module 303, missing image/video part marking to correct for missing parts in the image/video due to transmission errors through the wireless and wireline network 304. The exact combination and type of these algorithms depend on the specific device 301, the modules 302 and 303, and may also depend on the wireless network 304. The type and degree of pre-processing conduced depends on the parameters of the input. For example, stitching and combining for video frames is only applied if the original input is a video stream. As another example, the JPEG artifact removal can be applied at different levels depending on the JPEG compression factor of the image. As yet another example, the gamma correction takes into account the nature and characteristics of the digital imaging sensor 302, since different wireless portable devices 301 with different digital imaging sensors 302 display different gamma responses. The types of decisions and processing executed at 301 are to be contrasted with the prior art described in FIGS. 1 and 2, in which the software runs on a specific device. Hence, under prior art most of the decisions described above are not made by the software, since prior art software is adapted to the specific hardware on which it runs, and such software is not designed to handle multiple hardware combinations. In essence, prior art software need not be make these decisions, since the device (that is, the combined hardware/software offering in prior art) has no flexibility to make such decisions and has fixed imaging characteristics.

In step 402, the processing is now performed on a single grayscale image. A search is made for "key" alphanumeric characters over a range of values. In this context, a "key" character is one that must be in the given image for the template or templates matching that image, and therefore a character that may be sought out and identified. The search is performed over the whole image for the specific key characters, and the results of the search help identify the location of the alphanumeric strings. An example would be searching for the digits "0" or "1" over the whole image to find locations of a numeric string. The search operation refers to the multiple template matching algorithm described in FIG. 5 and in further detail in regards to step 403. Since the algorithm for the search operation detects the existence of a certain specific template of a specific size and orientation, the full search involves iteration over several scales and orientations of the image (since the exact size and orientation of the characters in the image is not known a-priori). The full search may also involve iterations over several "font" templates for a certain character, and/or iterations over several potential "key" characters. For example, the image may be searched for the letter "A" in several fonts, in bold, italics etc. The image may also be searched for other characters since the existence of the letter "A" in the alphanumeric string is not guaranteed. The search for each "key" character is performed over one or more range of values, in which "range of value" means the ratios of horizontal and vertical size of image pixels between the resized image and the original image. It should be noted that for any character, the ratios for the horizontal and vertical scales need not be the same.

In step 403, the search results of step 402 are compared for the different scales, orientations, fonts and characters so that the actual scale/orientation/font may be determined. This can be done by picking the scale/orientation/font/character combination which has yielded the highest score in the multiple template matching results. An example of such a score function would be the product of the template matching scores for all the different templates at a single pixel. Let us consider a rotated and rescaled version of the original image I after preprocessing 402. This version I(alpha,c) is rotated by the angle alpha and rescaled by a factor c. Let us denote by $T^A_i(x,y)$ the value of the normalized cross correlation value of template i of the character "A" at pixel x,y in the image I(alpha,c). Then a valid score function for I(alpha,c) would be $\max_{(x,y)}\{\text{Prod}_{i=1\ldots N} T^A_i(x,y)\}$. This score function would yield 1 where the original I contains a version of the character A rotated by -alpha and scaled by 1/c. Instead of picking just one likely candidate for alpha,c based on the maximum score, it is possible to pick several candidates and proceed with all of them to the next steps.

In step 404, the values of alpha,c, and font have been determined already, and further processing is applied to search for the character line, the line edge, and the line orientation, of consecutive characters or digits in the image. In this context, "line" (also called "character line") is an imaginary line drawn through the centers of the characters in a string, "line edge" is point where a string of characters ends at an extreme character, and "line orientation" is the angle of orientation of a string of characters to a theoretical horizontal line. It is possible to determine the line's edges by characters located at those edges, or by a-priori other knowledge about the expected presence and relative location of specific characters searched for in the previous steps 402 and 403. For example, a URL could be identified, and its scale and orientation estimated, by locating three consecutive "w" characters. Additionally, the edge of a line could be identified by a sufficiently large area void of characters. A third example would be the letters "ISBN" printed in the proper font which indicate the existence, orientation, size, and edge of an ISBN product code line of text.

Step 404 is accomplished by performing the multi-template search algorithm on the image for multiple characters yet at a fixed scale, orientation, and font. Each pixel in the image is assigned some score function proportional to the probability that this pixel is the center pixel of one of the searched characters. Thus, a new grayscale image J is created where the grayscale value of each pixel is this score function. A sample of such score function for a pixel (x,y) in the image J could be $\max_i\{\text{prod}_{j=1\ldots n} T^{c(i)}_j(x,y)\}$ where i iterates over all characters in the search, c(i) refers to a character, and j iterates over the different templates of the character c(i). A typical result of this stage would be an image which is mostly "dark" (corresponding to low values of the score function for most pixels) and has a row (or more than one row) of bright points (corresponding to high values of the score function for a few pixels). Those bright points on a line would then signify a line of characters. The orientation of this line, as well as the location of the leftmost and rightmost characters in it, are then determined. An example of a method of determining those line parameters would be picking the brightest pixel in the Radon (or Hough) transform of this score-intensity image J. It is important to note that if the number and relative positions of the characters in the line are known in advance (e.g., as in a license plate, an ISBN code, a code printed in advance), then the precise scale of the image c* could be estimated with greater precision than the original scale c.

In step 405, scale and orientation are corrected. The scale information {c,c*}, and the orientation of the line, derived from both steps 403 and 404, are used to re-orient and re-scale the original image I to create a new image I*(alpha*,c*). In the new image, the characters of a known font, default size, and orientation, all due to the algorithms previously executed.

The re-scaled and re-oriented image from step 405 is then used for the final string recognition 406, in which every alphanumeric character within a string is recognized. The actual character recognition is performed by searching for the character most like the one in the image at the center point of the character. That is, in contrast with the search over the whole image performed in step 402, here in step 406 the relevant score function is calculated at the "center point" for each character, where this center point is calculated by knowing in advance the character size and assumed spacing. An example of a decision function at this stage would be $C(x,y) = \max_i\{\text{prod}_{i=1\ldots n} T^{c(i)}_j(x,y)\}$ where i iterates over all potential characters j over all templates per character. The coordinates (x,y) are estimated based on the line direction and start/end characters estimated in step 405. The knowledge of the character center location allows this stage to reach much higher precision than the previous steps in the task of actual character recognition. The reason is that some characters often resemble parts of other characters. For example the upper part of the digit "9" may yield similar scores to the lower part of the digit "6" or to the digit "0". However, if one looks for the match around the precise center of the character, then the scores for these different digits will be quite different, and will allow reliable decoding. Another important and novel aspect of an exemplary embodiment of the invention is that at step 406, the relevant score function at each "center point" may be calculated for various different versions of the same character at the same size and at the same font, but under different image distortions typical of the imaging environment of the wireless portable device 301. For example, several different templates of the letter "A" at a given font and at a given size may be compared to the image, where the templates differ in the amount of pre-calculated image smear applied to them or gamma transform applied to them. Thus, if the image indeed contains at this "center point" the letter "A" at the specified font and size, yet the image suffers from smear quantified by a PSF "X", then if one of the templates in the comparison represents a similar smear PSF it would yield a high match score, even though the original font's reference character "A" contains no such image smear.

The row or multiple rows of text from step 406 are then decoded into a decoded character string 407 in digitized alphanumeric format.

There are very significant differences between the processing steps outlined in FIG. 4, and those of the prior art depicted in FIG. 2. For example, prior art relies heavily on binarization 202, whereas in an exemplary embodiment of the present invention the image is converted to gray scale in step 401. Also, whereas in prior art morphological operations 203 are applied, in an exemplary embodiment of the current invention characters are located and decoded by the multi-template algorithm in step 402. Also, according to an exemplary embodiment, the present invention searches for key alphanumeric characters 402 over multiple scales, whereas prior art is restricted to one or a very limited number of scales. Also, in the present the scale and orientation correction 405 is executed in reliance, in part, on the search for line, line edge, and line orientation from step 404, a linkage which does not exist in the prior art. These are not the only other differences between prior art and the present invention, there are many others as described herein, but these differences are illustrative of the novelties of the current invention.

Once the string of characters is decoded at the completion of step 407, numerous types of application logic processing 408 become possible. One value of the proposed invention, according to an exemplary embodiment, is that the invention enables fast, easy data entry for the user of the mobile device.

This data is human-readable alphanumeric characters, and hence can be read and typed in other ways as well. The logic processing in step 408 will enable the offering of useful applications such as:

Product Identification for price comparison/information gathering: The user sees a product (such as a book) in a store with specific codes on it (e.g., the ISBN alphanumeric code). The user takes a picture/video of the identifying name/code on the product. Based on (e.g., ISBN) code/name of the product, the user receives information on the price of this product, information etc.

URL launching: the user snaps a photo of an http link and later receives a WAP PUSH message for the relevant URL.

Prepaid card loading/Purchased content loading: The user takes a photo of the recently purchased pre-paid card and the credit is charged to his/her account automatically. The operation is equivalent to currently inputting the prepaid digit sequence through an IVR session or via SMS, but the user is spared from actually reading the digits and typing them one by one.

Status inquiry based on printed ticket: The user takes a photo of the lottery ticket, travel ticket, etc., and receives back the relevant information, such as winning status, flight delayed/on time, etc. The alphanumeric information on the ticket is decoded by the system and hence triggers this operation.

User authentication for Internet shopping: When the user makes a purchase, a unique code is displayed on the screen and the user snaps a photo, thus verifying his identity via the phone. Since this code is only displayed at this time on this specific screen, it represents a proof of the user's location, which, coupled to the user's phone number, create reliable location-identity authentication.

Location Based Coupons: The user is in a real brick and mortar store. Next to each counter, there is a small sign/label with a number/text on it. The user snaps a photo of the label and gets back information, coupons, or discounts relevant to the specific clothes items (jeans, shoes, etc.) he is interested in. The label in the store contains an ID of the store and an ID of the specific display the user is next to. This data is decoded by the server and sent to the store along with the user's phone ID.

Digital signatures for payments, documents, identities: A printed document (such as a ticket, contract, or receipt) is printed together with a digital signature (a number of 20-40 digits) on it. The user snaps a photo of the document and the document is verified by a secure digital signature printed in it. A secure digital signature can be printed in any number of formats, such as, for example, a 40-digit number, or a 20-letter word. This number can be printed by any printer. This signature, once converted again to numerical form, can securely and precisely serve as a standard, legally binding digital signature for any document.

Catalog ordering/purchasing: The user is leafing through a catalogue. He snaps a photo of the relevant product with the product code printed next to it, and this is equivalent to an "add to cart operation". The server decodes the product code and the catalogue ID from the photo, and then sends the information to the catalogue company's server, along with the user's phone number.

Business Card exchange: The user snaps a photo of a business card. The details of the business card, possibly in VCF format, are sent back to the user's phone. The server identifies the phone numbers on the card, and using the carrier database of phone numbers, identifies the contact details of the relevant cellular user. These details are wrapped in the proper "business card" format and sent to the user.

Coupon Verification: A user receives via SMS/MMS/WAP PUSH a coupon to his phone. At the POS terminal (or at the entrance to the business using a POS terminal) he shows the coupon to an authorized clerk with a camera phone, who takes a picture of the user's phone screen to verify the coupon. The server decodes the number/string displayed on the phone screen and uses the decoded information to verify the coupon.

Figure 5:
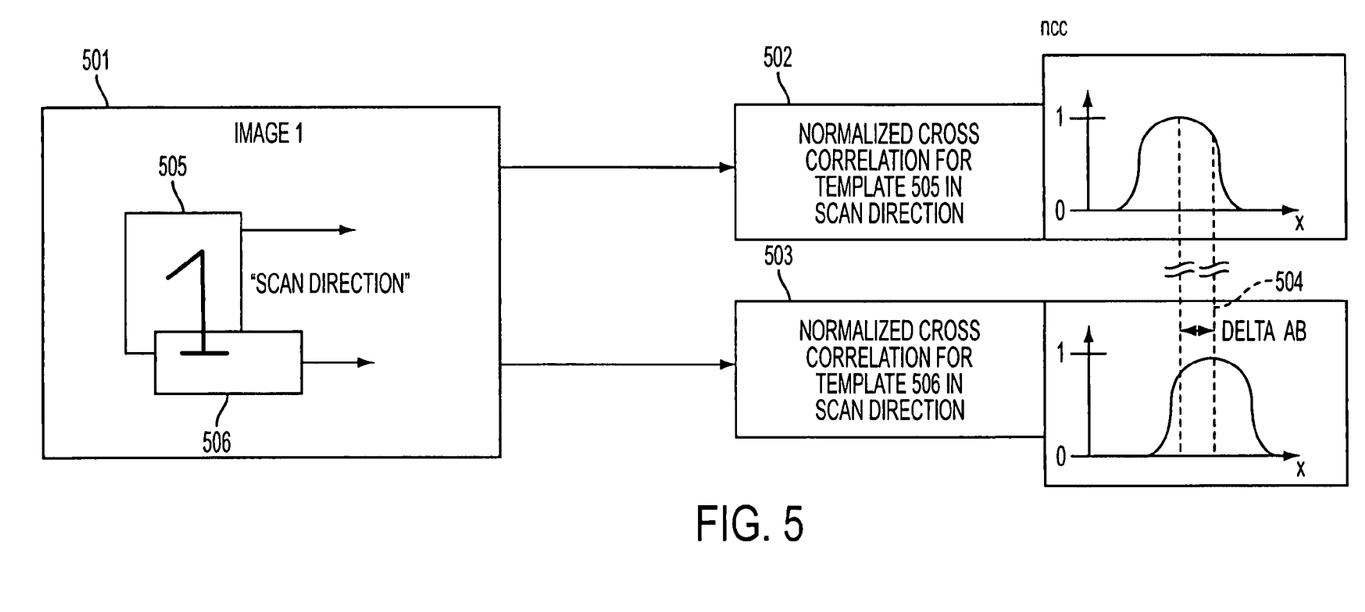
FIG. 5 is an illustration of the method of multiple template matching which is one algorithm in an exemplary embodiment of the invention.

FIG. 5 illustrates graphically some aspects of the multi-template matching algorithm, which is one important algorithm used in an exemplary embodiment of the present invention (in processing steps 402, 404, and 406, for example). The multi-template matching algorithm is based on a well known template matching method for grayscale images called "Normalized Cross Correlation" (NCC). NCC is currently used in machine vision applications to search for pre-defined objects in images. The main deficiency of NCC is that for images with non-uniform lighting, compression artifacts and/or defocusing issues, the NCC method yields many "false alarms" (that is, incorrect conclusion that a certain status o object appears) and at the same time fails to detect valid objects. The multi-template algorithm extends the traditional NCC by replacing a single template for the NCC operation with a set of N templates, which represent different parts of the object (or character in the present case) that is searched. The templates 505 and 506 represent two potential such templates, representing parts of the digit "1" in a specific font and of a specific size. For each template, the NCC operation is performed over the whole image 501, yielding the normalized cross correlation images 502 and 503. The pixels in these images have values between −1 and 1, where a value of 1 for pixel (x,y) indicates a perfect match between a given template and the area in image 501 centered around (x,y). At the right of 502 and 503, respectively, sample one-dimensional cross sections of those images are shown, showing how a peak of 1 is reached exactly at a certain position for each template. A very important point is that even if the image indeed has the object to be searched for centered at some point (x,y), the response peaks for the NCC images for various templates will not necessarily occur at the same point. For example, in the case displayed in FIG. 5, there is a certain difference 504 of several pixels in the horizontal direction between the peak for template 505 and the peak for template 506. These differences can be different for different templates, and are taken into account by the multi-template matching algorithm. Thus, after the correction of these deltas, all the NCC images (such as 502 and 503) will display a single NCC "peak" at the same (x,y) coordinates which are also the coordinates of the center of the object in the image. For a real life image, the values of those peaks will not reach the theoretical "1.0" value, since the object in the image will not be identical to the template. However, proper score functions and thresholds allow for efficient and reliable detection of the object by judicious lowering of the detection thresholds for the different NCC images. It should be stressed that the actual templates can be overlapping, partially overlapping or with no overlap. Their size, relative position and shape can be changed for different characters, fonts or environments. Furthermore, masked NCC can be used for these templates to allow for non-rectangular templates.

The system, method, and algorithms, described herein, can be trivially modified and extended to recognize other characters, other fonts or combinations thereof, and other arrangements of text (such as text in two rows, vertical text rather than horizontal, etc.). Nothing in the existing detailed description of the invention makes the invention specific to the recognition of specific fonts or characters or languages/codes.

The system, method, and algorithms described in FIG. 4 and 5 enable the reliable detection and decoding of alphanumeric characters in situations where traditional prior art could not perform such decoding. At the same time, potentially other new algorithms could be developed which are extensions of the ones described here or are based on other mechanisms within the contemplation of this invention. Such algorithms could also operate on the system architecture described in FIG. 3.

Other variations and modifications of the present invention are possible, given the above description. All variations and modifications which are obvious to those skilled in the art to which the present invention pertains are considered to be within the scope of the protection granted by this Letters patent.

What is claimed is:

1. A method for decoding printed alphanumeric characters from images or video sequences captured by a wireless device, the method comprising:
   pre-processing the image or video sequence to optimize processing in all subsequent operations;
   searching one or more grayscale images for key alphanumeric characters on a range of scales;
   comparing the values on said range of scales to a plurality of templates in order to determine the characteristics of the alphanumeric characters;
   performing additional comparisons to a plurality of templates to determine character lines, line edges, and line orientation;
   processing information from prior said pre-processing, said searching, said comparing, and said performing additional comparisons, to determine the corrected scale and orientation of each line;
   recognizing the identity of each alphanumeric character in a string of such characters;
   decoding the entire character string in digitized alphanumeric format.

2. The method of claim 1, wherein:
the pre-processing comprises conversion from a color scale to a grayscale, and the stitching and combining of video frames to create a single larger and higher resolution grayscale image.

3. The method of claim 1, wherein:
the pre-processing comprises JPEG artifact removal to correct for compression artifacts of image/video compression executed by the wireless device.

4. The method of claim 1, wherein:
the pre-processing comprises part making of missing image/video data to correct for missing parts in the data due to transmission errors.

5. The method of claim 1, wherein:
comparing the key alphanumeric values to a plurality of template in order to determine the characteristics of the alphanumeric characters, comprises executing a modified Normalized Cross Correlation in which multiple parts are identified in the object to be captured from the image or video sequence, each part is compared against one or more templates, and all templates for all parts are cross-correlated to determine the characteristics of each alphanumeric image captured by the wireless device.

6. The method of claim 1, wherein:
the method is conducted in a single session of communication with the wireless communication device.

7. The method of claim 6, further comprising:
application logic processing of the decoded character string in digitized alphanumeric format in order to enable additional applications.

8. The method of claim 1, wherein:
the method is conducted in multiple sessions of communication with the wireless communication device.

9. The method of claim 8, further comprising:
application logic processing of the decoded character string in digitized alphanumeric format in order to enable additional applications.

* * * * *